July 24, 1928.

T. M. BRUECK 1,678,179

PHOTOGRAPHIC SHUTTER

Filed Oct. 8, 1926

INVENTOR
Theodore M. Brueck
BY
his ATTORNEY

July 24, 1928.  
T. M. BRUECK  
PHOTOGRAPHIC SHUTTER  
Filed Oct. 8, 1926  
1,678,179  
3 Sheets-Sheet 2

INVENTOR  
Theodore M Brueck  
BY  
his ATTORNEY

July 24, 1928.
T. M. BRUECK
1,678,179
PHOTOGRAPHIC SHUTTER
Filed Oct. 8, 1926
3 Sheets-Sheet 3
Fig. 6
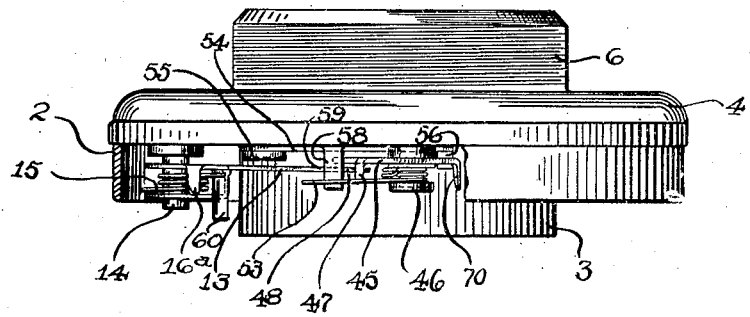
Fig. 7
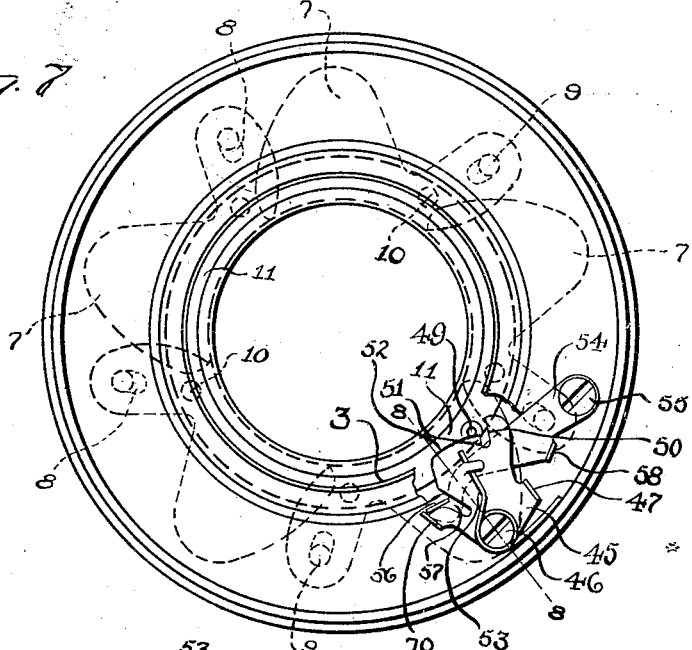
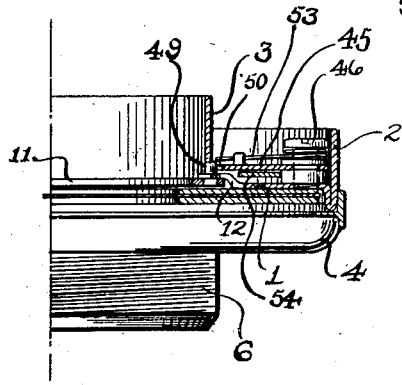
Fig. 8
INVENTOR
Theodore M. Brueck
BY H. H. Simms
his ATTORNEY Patented July 24, 1928.

1,678,179

UNITED STATES PATENT OFFICE.

THEODORE M. BRUECK, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

Application filed October 8, 1926. Serial No. 140,249.

The present invention relates to photographic shutters and more particularly to the type in which there is employed a motor member which, when moved in one direction to store energy in a spring, does not affect an exposure member connected with the blades and which when moved in the other direction shifts the exposure member to effect the opening of the blades, thereafter releasing the exposure member to permit the blades to close under the action of a separate spring. An object of this invention is to provide a means which will connect the master member with the exposure member after the master member has opened the blades and released the exposure member whereby the spring of the master member may be imposed upon the exposure member for effecting the closure of the blades. A further object of the invention is to render this connection inoperative so that it will be possible to obtain two different speeds, one, a slower speed, produced by the spring of the blade mechanism, acting on the blade mechanism and, the other, a higher speed, produced by the spring of the master member also acting on the blade mechanism. A still further object of the invention is to so control this connection between the master member and the exposure member that the connection becomes ineffective when a retarding mechanism is acting upon the blade mechanism and becomes effective when such retarding mechanism is rendered ineffective upon the blade mechanism.

To these and other ends, the invention consists of certain parts and combinations of parts, all of which will be hereinafter described, the novel features being pointed out in the appended claims.

In the drawings:

Fig. 6 is a side view of the shutter with part of the outside casing broken away to disclose the master member and the exposure member;

Fig. 7 is an interior view showing the blade ring, the exposure member and the speed up lever in cooperation therewith; part of the inner wall of the casing being broken away to show the pin riding on the curved surface of the exposure member; and Fig. 8 is a section on the line 8—8, Fig. 7.

Figure 1:
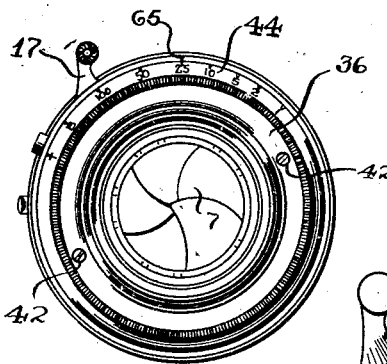
Fig. 1 is a face view of a shutter constructed in accordance with this invention.

Referring more particularly to the illustrated embodiment of the invention, 1 illustrates an annular plate with a surrounding annular flange 2 and an inner annular flange 3 about the aperture of the shutter formed by the central opening of the plate 1. A cover member 4 carrying an iris diaphragm (not shown) is arranged to one side of the shutter casing, while the opposite side of the shutter casing is closed by an annular plate 5 through which the flange 3 projects, this flange being adapted to receive one of the lens elements while an annular projecting flange 6 on the cover member 4 receives the other lens element. This casing is not claimed specifically herein, but it is illustrated in more detail in an application for patent filed by Rudolph Klein on August 11th, 1921, Serial No. 491,404.

Associated with the shutter casing is a blade mechanism comprising, in this instance, a plurality of blades 7 arranged symmetrically about the shutter aperture and having slots 8 operating on pins 9 projected from one side of the shutter casing ring 1. These blades are all pivotally connected at 10 to an operating ring 11 which is arranged in a depression 12 formed in the annular plate 1 of the shutter casing on that side nearest the blades. The application of Rudolph Klein, above mentioned, shows and describes fully this blade mechanism if the illustration and description herein is not sufficient. So far as this invention is concerned, the structure of this blade mechanism is immaterial.

Figure 3:
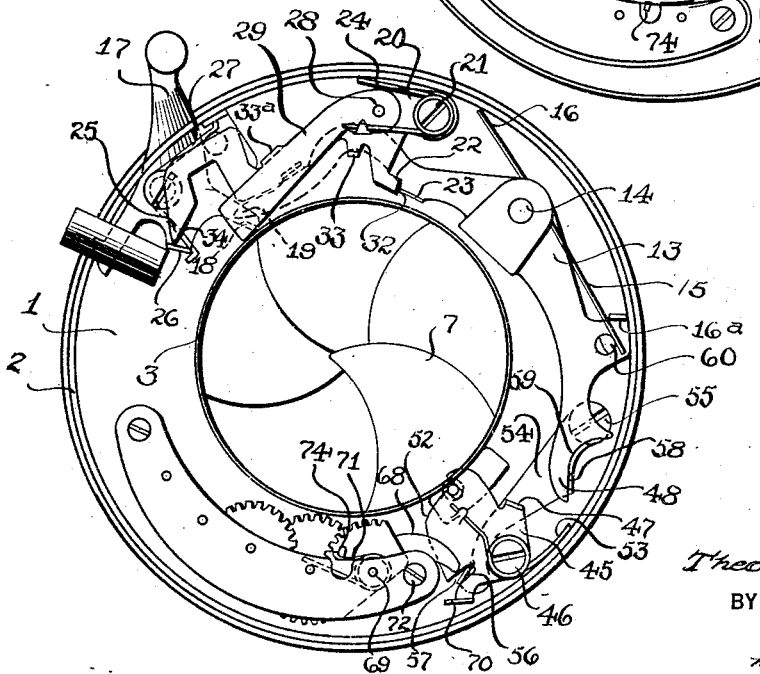
Fig. 3 is an interior view showing the cover plate and parts carried thereby removed, the shutter being shown in closed position and only a part of the retarding mechanism being illustrated.

For operating the blade mechanism there may be employed a motor or master member which is, in this instance, in the form of a double arm lever 13 pivoted at 14 and acted upon by a motor spring 15 which is coiled about the pivot 14, the end 16 bearing against the flange 2 and the opposite end bearing against the shoulder 16ª on the master member, so as to normally hold the latter in the position illustrated in Fig. 3 of the drawings. This master member connects with the blade mechanism through a lost motion connection, so that when the master member is moved to store energy in the spring 15, it slips past and does not have any action on the blade mechanism or exposure member, but, upon the return movement of the master member under the action of the spring 15, the master member effects the opening and then the closing of the blade mechanism, this being effected by the master member engaging the exposure member and then slipping off the same. This general operation is old in photographic shutters.

In the illustrated construction, the invention is shown as embodied in what is known as an automatic shutter, that is, one of the type where there is employed an actuating or operating member 17 which has a laterally projected lug 18 adapted to cooperate with an end 19 of the master lever to shift said master lever against the action of its spring 15 in order to store energy in the spring and to thereafter slip off the end of the master lever to permit the latter to return to its normal position under the action of the spring 15. It will, of course, be understood that this invention is not limited to the automatic type of shutter.

In the automatic type of shutter there is employed what is known as the detaining means which will act on the master lever in order to stop the latter on its return movement after it has opened the blades so that what is known as time or bulb exposures may be made. In this instance, there is illustrated a detaining means like that shown in the Klein application before mentioned comprising a detent 20 pivoted at 21 and having an abutment or shoulder 22 adapted to cooperate with an abutment or shoulder 23 on the master member after the latter has moved to open the blades. A spring 24 normally acts on this detaining member 20 to move it to detaining position. This detent also has a shoulder 25 which cooperates with a laterally extending shoulder 26 on the actuating lever to prevent the return of the actuating lever under the action of its spring 27 when the shutter is adjusted for time exposures. The detent 20 also has pivoted thereto at 28 a latch 29 which is acted on by a spring 30 normally to hold the shoulder 31 on the latch in the path of the shoulder 26 on the actuating lever 17.

Figures 4, 5:
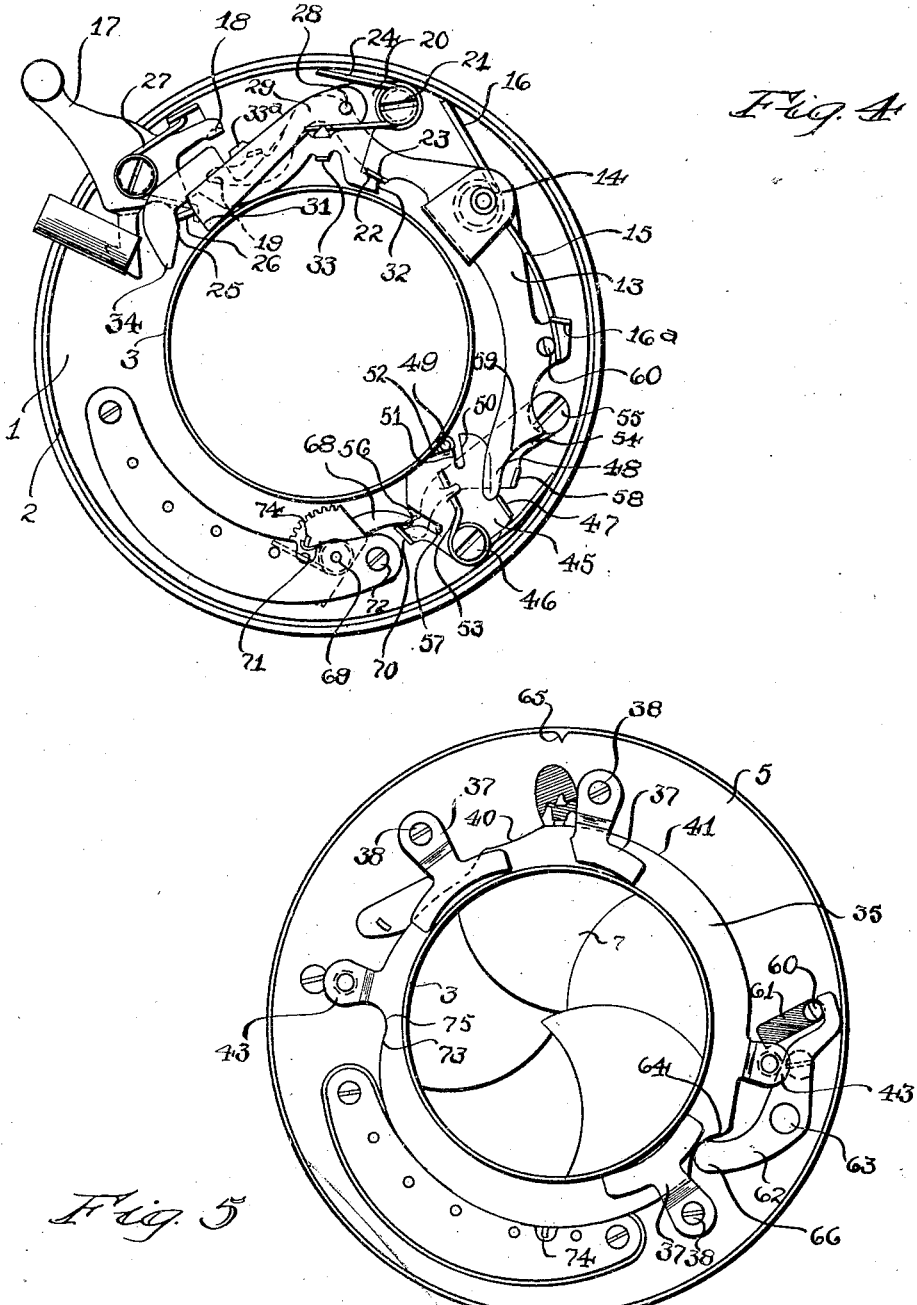
Fig. 4 is a view similar to Fig. 3, showing the shutter blades in open position.
Fig. 5 is a view similar to Fig. 2, showing the controlling member adjusted to render the connection between the master member and the exposure member operative and the connection between the retarding device and exposure member inoperative.

When the shutter is set for time exposures and is operated from the position illustrated in Fig. 3, the detent 20 has its shoulder 32 cooperating with the edge of the lug 23 while the shoulder 26 lies beneath the free end of the detent 20. At the same time, the shoulder 31 of the latch 29 lies in the path of the shoulder 26 of the actuating lever 17. As the actuating lever 17 moves the master member 13 through the projection 18 cooperating with the end 19 of the master lever, the detent 20 swings under its spring to carry the shoulder 22 into the path of the shoulder 23 on the master lever. At the same time, the master lever through a laterally extending projection 33 on the latch 29 shifts such latch 29 to swing the shoulder 31 of the latch out of the path of the projection 26 on the actuating lever. Eventually the shoulder 18 slips off the end 19 of the master lever, permitting the latter to return under the action of its spring 15 until the shoulder 23 engages the shoulder 22 when the shutter blades will be in open position. The release of pressure on the actuating lever 17 permits the latter to turn slightly under the action of its spring until the shoulder 26 engages the shoulder 25 when the return movement of the actuating lever 17 under the action of its spring is stopped. This shoulder 26, when the actuating lever 17 was moved to operate the master member 13 passed the latch 29, so that the latter was held away from its normal position by the shoulder 26 until the actuating lever was released and engaged the shoulder 25 whereupon the latch 29 dropped to the position shown in Fig. 4 in the path of the shoulder 26. As this latch 29 is pivoted to the detent 20 to one side of the turning axis of the latter, the further depression of the lever 17 with the parts as shown in Fig. 4 will push on the end of the latch 29 and act on the detent 20 to shift the shoulder 22 on the detent out of the path of the shoulder 23 on the master lever to permit the master lever to effect the closing of the blades through the spring 15.

Bulb exposures in the illustrated embodiment are effected by depressing the actuating lever 17 to cause the shoulder 18 thereof to engage with the end 19 of the master lever 13 and then to slip off such end. The detaining member 20 now moves under the action of its spring to throw the shoulder 22 into the path of the shoulder 23 on the master lever 13. However, the time detent has its movement limited in a manner to be described through a projection 33 thereon so that the shoulder 25 on the detent does not move into the path of the shoulder 26 on the actuating lever, but instead a bevelled or inclined surface 34 on the detent lies in the path of the shoulder 26. At the same time, the operating latch 29 of the detaining member 20 is shifted out of the path of the shoulder 26 through the master member engaging with the shoulder 23. As long as pressure is held on the actuating member 17, the master member will be held in the position where the shutter blades are open, due to the fact that the shoulder 22 will cooperate with the shoulder 23, but, upon the release of pressure of the actuating lever 17, the latter moves to its normal position under the action of its spring and cooperates with the cam surface 34 on the detaining member 20, kicking such detaining member so as to throw the shoulder 22 thereon out of the path of the shoulder 23 on the master member, permitting the master member to move under its spring 15 to effect the closing of the blades.

Instantaneous exposures are effected by controlling the detaining member 20 through the projection 31 to hold the latter against movement to carry the shoulder 22 into the path of the shoulder 23 of the master lever. As a consequence, when the actuating lever 17 is moved, the shoulder 18 thereon engages the end 19 of the master member and shifts the latter against the action of the spring 15 until the end 19 slips off the shoulder 18 after which the master member will return under the action of the spring 15, first effecting the opening of the shutter blades and then effecting the closing of the shutter blades.

Control of the detent 20 is, in this instance, effected through a rotary controller or ring 35 which is mounted to turn on the flange 3, being supported on the annular closure plate 5 which also surrounds the flange 3. Retaining clips 37 secured by screws 38 hold this ring 35 to the plate 5 by overhanging the ring. This ring has a surface at the point 39 which when opposite the shoulder 33 on the time detent 20 permits time action. A surface 40 adjacent the surface 39 controls the detent through the shoulder 33 to produce bulb action, while the surface 41 on the ring 35 produces instantaneous exposures by holding the detent 20 out of cooperation with the master member 13, all of which has been heretofore described. An additional cover and dial ring 36 may be by screws 42 secured to ears 43 on the ring 35 and covers the ring and the parts carried by the cover plate 5. The surface of this ring 36 is formed with graduations 44 through which the ring 35 may be positioned to obtain time, bulb and different graduated instantaneous exposures.

Should a more detailed explanation of the operation of the detaining means be required, reference may be had to the application of Klein hereinbefore mentioned, where the parts are substantially the same.

The connection between the master member and the blade mechanism embodies, in this instance, an exposure member 45 which is pivoted at 46 and has a lateral projection or shoulder 47 adapted to be engaged by the end 48 of the master lever or member 13 to provide a slip off and lost motion connection between the master member and the exposure member. This exposure lever also has a lost motion connection with the exposure ring 11 embodying, in this instance, a projection 49 on the ring and two abutments 50 and 51 on the exposure lever, these abutments lying in parallel relation and spaced apart so as to receive between them the pin 49 on the exposure ring 11. The abutment 51 is shorter than the abutment 50 so that the pin 49 may pass out of engagement with the abutment 51 and cooperate with the curved surface 52 on the exposure lever concentric with the axis of turning of the latter. A spring 53 acts on the exposure lever to hold the latter in the position shown in Fig. 3 where the shoulder 50 will engage the pin 49 and maintain the shoulder blades in closed positions and therefore acts on the blade mechanism. The master member 13 through its engagement with the projection or shoulder 47 moves the exposure member 45 in the opposite direction and as the master lever and the exposure lever turn about different centers, a point is reached when the end 48 of the master lever will slip off the projection 47 and permit the exposure lever to return to its normal position under the action of its spring 53. When the master lever is moved against the action of its spring 15, the end 48 rides over the projection 47 without effecting the movement of the exposure lever 45, due to the lateral flexibility of the end of the master member. Thereafter the end 48 of the master member engages the projection 47 and shifts the exposure lever 45 against the action of the spring 53, first causing the shoulder 51 to effect the movement of the ring 11 to open the blades. The master member then moves the exposure lever to cause the surface 52 to ride on the projection 49 and hold the blades in open position until the end 48 of the master lever slides off the projection 47, after which the spring 53 of the exposure lever 45 again acts on such exposure lever 45 and causes the curved surface 52 to return over the projection 49 of the blade ring 11 until the abutment 50 again engages the projection 49 when the blade ring will be shifted in the opposite direction to close the blades under the action of the spring 53 of the exposure lever. This form of exposure lever is also disclosed in the Klein application above mentioned.

The spring 53 of the exposure lever is weaker than the spring 15 of the master member 13 and the blades are held closed only by this weaker spring 53. This does not provide a sufficiently positive closing action for the blades. It is a feature of this invention to provide a more positive closing action for the blades and this result is accomplished by the provision of a means such as a lever or member 54 which preferably is pivoted at 55 on one side of the pivot 46 of the exposure lever and has connection with the exposure lever 45 on the opposite side of the pivot 46 of said exposure lever 45. In this instance, this connection is in the form of a lug 56 extending laterally from the lever 52 and operating in a slot 57 formed in the exposure lever 45. This lever 54 also has a lateral projection 58 which lies in the path of a portion 59 of the master lever 13. After the end 48 of the master lever slips off the projection 47 of the exposure lever to release the latter, the portion 59 of the master lever 13 enters into engagement with the shoulder or projection 58 of the lever 54 and shifts said lever so that the latter through the connections 56 and 57 will act on the exposure lever 45 in a direction to move the latter so as to assure the closing of the blades through the action of the spring 15 of the master lever. The master lever at 59 maintains this engagement with the projection of shoulder 58 while the blades are closed so that the blades are held closed by the action of the spring 15 as well as by the action of the spring 53. This lost motion connection between the master lever 13 and the exposure lever 45 is believed to be a novel feature of applicant's invention.

There is an interval of time between the time when the end 48 of the master member slips off the projection 47 and the time when the portion 59 of the master member engages the projections 48 on the lever 54 and with the end in view of providing two different speeds for closing the shutter, provision is made for preventing the master member 13 engaging the projection 48. When the master member engages the projection 58, the closing speed is faster, than when the master member slips off the projection 47 and does not engage said projection 58. The controlling means for obtaining these two different speeds embodies, in this instance, a projection 60 extending laterally from the master member 13 and operating through a slot 61 in the cover plate 5. A two arm lever 62 pivoted at 63 has one end acting as an abutment lying in the path of the projection 60, so as to stop the master member as it slips off the projection 47 of the exposure lever 45. This lever 62 preferably is controlled by the speed controlling ring 35 hereinbefore described. For this purpose the speed controlling ring has a notch 64 in which the end 66 of the lever 62 opposite the end forming the abutment for the pin 60 is adapted to enter so that the lever 62 will not interfere with the movement of the projection 60. This notch is so positioned on the ring that, when the dial disk or indicator member 36 is adjusted so that the division "100" is adjacent the pointer or index 65, the notch 64 will lie opposite the end 66 of the lever 62 so that the other end of the lever 62 does not interfere with the movement of the pin 60. At one side of the notch 64 a cam surface 67 is provided. This cam surface engages the end 66 of the lever 62 and holds the opposite end of the lever into the path of the projection 60 so that the master member is stopped before it engages the projection 58 on the lever 59 and, as a consequence, the blades are closed solely under the action of the spring 53 acting on the exposure lever or member 45. The cam surface 67 is an extended one and cooperates with the lever 62 for any adjustment of the indicator ring 36 between 50 and 1, these adjustments being for what is known as graduated time exposures.

Figure 2:
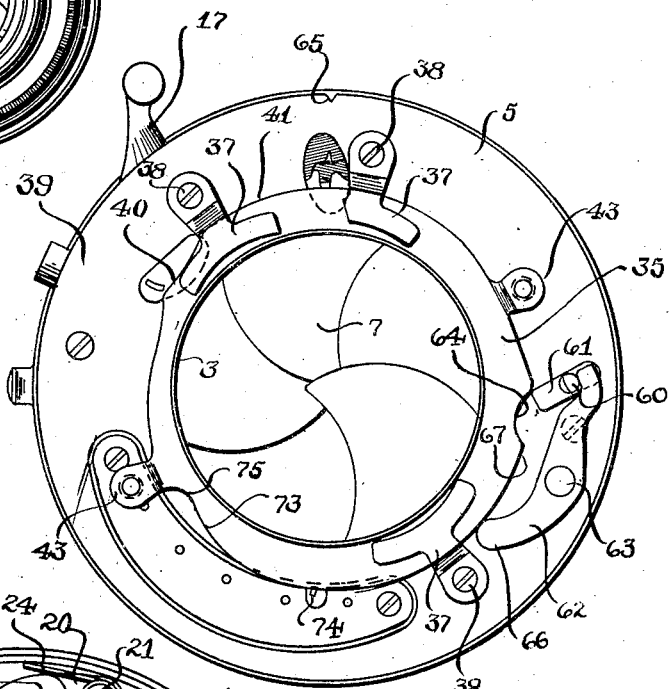
Fig. 2 is an enlarged view showing the dial plate of the shutter. illustrated in Fig. 1, removed, the controlling member being adjusted to render the shutter closing connection between the master member and the exposure member inoperative, while the connection between the retarding device and the retarding member is operative.

The graduated time exposures are obtained as usual through a retarding mechanism of which any suitable type may be employed. In this instance, a mechanism of the type shown in the Klein application, before mentioned, is used, only part of this mechanism, however, being shown. This retarding mechanism has at one end an oscillatory member 68 which is pivoted at 69 and has engagement with the laterally extending projection 70 formed on the exposure member 45. A spring 71 acts on this oscillatory member and maintains the latter normally toward the projection 70 and a stop 72. This oscillatory member opposes the movement of the exposure lever 45 under the action of the master member 13, while the pin 49 is travelling on the surface 52 under the action of the master lever. Normally the oscillatory member 68 lies in spaced relation to the projection or abutment 70, so that there is a lost motion connection between the exposure member 45 and the retarding mechanism. In other words, when the master member engages the projection 47 on the exposure member 45 and moves the exposure lever to open the blades, the projection 70 travels toward the oscillatory arm 68 until the pin 49 slips out of engagement with the abutment 51. About this time the projection 70 engages the oscillatory arm 68, the pin 49 travels on the curved surface 52 until the master member slips off the projection 47, so that the retarding action takes place while the blades are open and is imposed on the master member 13 through the exposure member 45. Control of the retarding mechanism is effected through a cam surface 73 on the controlling ring 35 which merges into the cam surface 67. This cam surface cooperates with a pin or projection 74 on the oscillatory member 68 and acts as an adjustable stop to limit the movement of the oscillatory member toward the abutment 70, the spring 71 holding the projection 74 against the cam 73. The turning of the cam effects the movement of the oscillatory member 68 toward and from the stop. It is apparent that the further the arm 68 is positioned from the projection 70, the less will be the retarding action of the retarding mechanism. When the projection 74 lies opposite the low point 75 on the cam, the retarding device will have its greatest retarding action and when it reaches its highest point on the cam as illustrated in Fig. 2, no retarding action occurs. Whenever the retarding device is active, the portion 67 of the cam will engage with the end 66 of the lever 62, so that the spring 15 of the master member will not assist in closing the blades.

What I claim as my invention and desire to secure by Letters Patent is:

1. A photographic shutter comprising a master member, a spring for moving the master member in one direction, a blade mechanism, an exposure member connected with the blade mechanism, for moving the latter in opposite directions, a spring acting on the blade mechanism to effect the closing of the shutter, a lost motion connection between the master member and the exposure member constructed to permit the master member to move past the exposure member when moved to store energy in the master member spring and to effect connection between the master member and the exposure member to shift the exposure member in order to effect the opening of the shutter and then to permit the master member to release the exposure member to permit the shutter to close under the action of the shutter closing spring, and a connecting means between the master member and the exposure member moved by the master member on the return movement of the latter under the action of the spring and after the master member releases the exposure member to effect the movement of the exposure member in a direction to close the blades.

2. A photographic shutter comprising a master member, a spring for moving the master member in one direction, a blade mechanism, a pivoted exposure member connected with the blade mechanism for moving the latter to open the shutter when moved in one direction and to close the shutter when moved in the opposite direction, a spring acting on the blade mechanism to effect the closing of the shutter, a lost motion connection between the master member and the exposure member constructed to permit the master member to move past the exposure member when moved to store energy in the master member spring and to effect connection between the master member and the exposure member on one side of the pivot of the latter to shift the exposure member in order to effect the opening of the shutter and then to permit the master member to release the exposure member to permit the shutter to close under the action of the blade closure spring, and a lever engaging the exposure member on that side of the axis of turning of the latter opposite the side to which the master member first connects and operated by the master member on the return movement of the latter under the action of its spring and after the master member releases the exposure member to effect the closing of the shutter blades through the spring of the master member.

3. A photographic shutter comprising a master member, a spring for moving the master member in one direction, a blade mechanism, an exposure member connected with the blade mechanism for moving the latter in opposite directions, a spring acting on the blade mechanism to effect the closing of the shutter, a lost motion connection between the master member and the exposure member constructed to permit the master member to move past the exposure member when moved to store energy in the master member spring, and to effect connection between the master member and the exposure member to shift the exposure member in order to effect the opening of the shutter and then to permit the master member to release the exposure member to permit the shutter to close under the action of the shutter closing spring, a connection between the master member and the exposure member moved by the master member on the return movement of the latter under the action of its spring and after said master member releases the exposure member to effect the moving of the exposure member in a direction to close the blades under the action of the spring of the master member, and means for rendering such connection ineffective so that the blades may be closed under the action of the blade closing spring independently of the spring of the master member.

4. A photographic shutter comprising a master member, a spring for moving the master member in one direction, a blade mechanism, an exposure member connected with the blade mechanism for moving the latter in opposite directions, a spring acting on the blade mechanism to effect the closing of the shutter, a lost motion connection between the master member and the exposure member constructed to permit the master member to move past the exposure member when storing energy in the master member spring and to effect connection between the master member and the exposure member to shift the exposure member in order to effect the opening of the shutter and then to permit the master member to release the exposure member in order that the shutter may close under the action of the blade closing spring, a lever having engagement with the exposure member on that side of the axis of turning of the latter opposite the side with which the master member connects when the latter moves the exposure member to effect the opening of the shutter blades, said lever being so positioned that it may be moved by the master member on the return movement of the latter under the action of the spring and after said master member releases the exposure lever so that the master member may move the exposure member through such lever in a direction to close the blades, and means arranged to cooperate with the master member to prevent its connecting with the connecting lever after releasing the exposure member so that the blades may be closed by the blade closing spring independently of the spring of the master member.

5. A photographic shutter comprising a master member, a spring for moving the master member in one direction, a blade mechanism, an exposure member connected with the blade mechanism for moving the latter in opposite directions, a spring acting on the blade mechanism to effect the closing of the shutter, a lost motion connection between the master member and the exposure member constructed to permit the master member to release the exposure member to permit the shutter to close under the action of the shutter closing spring, a detaining means for cooperation with the master member to hold the latter against movement under the action of the spring while the master member is in connection with the exposure member to hold the shutter open, a connection between the master member and the exposure member moved by the master member on the return movement of the latter under the action of the spring and after the master member releases the exposure member to effect the movement of the exposure member in a direction to close the blades, means for limiting the movement of the master member so that it will not operate said connecting means after the master member slips off the exposure member, a common controlling means for said limiting means and the detaining means constructed to hold the detaining means out of detaining relation with the master member and the limiting means out of limiting relation with the master member.

6. A photographic shutter comprising a master member, a spring for moving the master member in one direction, a blade mechanism, an exposure member connected with the blade mechanism, for moving the latter in opposite directions, a spring acting on the blade mechanism to effect the closing of the shutter, a lost motion connection between the master member and the exposure member constructed to permit the master member to move past the exposure member when moved to store energy in the master member spring and to effect connection between the master member and the exposure member to shift the exposure member in order to effect the opening of the shutter and then to permit the master member to release the exposure member to permit the shutter to close under the action of the shutter closing spring, a connection between the master member and the exposure member moved by the master member on the return movement of the latter under the action of the spring after the master member releases the exposure member to effect the movement of the exposure member in a direction to close the blades, a retarding mechanism having a connection with the exposure member, means for rendering the last mentioned connecting means between the master member and the exposure member inoperative so that the shutter closing spring will close the blades independently of the master member, and a common controlling means for the said last mentioned means and also for the retarding mechanism constructed to render the last mentioned connection between the master member and the exposure member operative when the action of the retarding mechanism on the exposure member is rendered inoperative and vice versa.

7. A photographic shutter comprising a master member, a spring for moving the master member in one direction, a blade mechanism, an exposure member connected with the blade mechanism for moving the latter in opposite directions, a spring acting on the blade mechanism to effect the closing of the shutter, a lost motion connection between the master member and the exposure member constructed to permit the master member to move past the exposure member when moved to store energy in the spring, a connection between the master member and the exposure member to shift the exposure member in order to effect the opening of the shutter and then to permit the master member to release the exposure member to close the shutter under the action of the blade closing spring, a retarding mechanism having connection with the exposure member, connecting means between the master member and the exposure member moved by the master member on the return movement of the latter under the action of the spring and after the master member releases the exposure member to effect the movement of the exposure member in a direction to close the blades, a rotary controller having connection with the retarding mechanism to render its connection with the exposure member inoperative and to adjust said connection to obtain varied retarding actions, and means for rendering said last mentioned connection between the master member and the exposure member inoperative, said means having connection with the rotary controller so that it makes the connection operative when the controller renders the retarding mechanism inoperative and makes said connection inoperative when the controller establishes an operative connection between the exposure member and the retarding mechanism.

8. A photographic shutter comprising a master member, a spring for moving the master member in one direction, a blade mechanism, a pivoted exposure member connected to the blade mechanism, a spring acting on the blade mechanism to effect the closing of the shutter, and two lost motion connections between the exposure lever and the master member, one acting on one side of the pivot of the exposure member and the other acting on the other side of the pivot of the exposure member, both connections being constructed to permit the master member to move in one direction without effecting any movement of the exposure member and in the other direction to operate through one of the lost motion connections to open the blades and then to release the same and through the other lost motion connection to impose the spring of the master member on the exposure member in the direction of closing of the shutter blades.

THEODORE M. BRUECK.